(12) United States Patent
Kwiat et al.

(10) Patent No.: US 6,424,665 B1
(45) Date of Patent: Jul. 23, 2002

(54) ULTRA-BRIGHT SOURCE OF POLARIZATION-ENTANGLED PHOTONS

(75) Inventors: Paul G. Kwiat, Santa Fe, NM (US); Phillippe H. Eberhard, El Cerrito, CA (US); Andrew G. White, Queensland (AU)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/550,179

(22) Filed: Apr. 14, 2000

Related U.S. Application Data
(60) Provisional application No. 60/131,753, filed on Apr. 30, 1999.

(51) Int. Cl.[7] .................................................. H01S 3/10
(52) U.S. Cl. ........................ 372/21; 359/497; 359/500; 372/27
(58) Field of Search ................................ 359/494, 495, 359/497, 500–501, 122, 156, 483, 485, 487, 488; 372/21, 27

(56) References Cited

U.S. PATENT DOCUMENTS

| | | | |
|---|---|---|---|
| 5,339,182 A | * | 8/1994 | Kimble et al. ............... 359/112 |
| 5,796,477 A | * | 8/1998 | Teich et al. .................. 356/318 |
| 6,057,541 A | * | 5/2000 | Steenblik ..................... 250/225 |
| 6,289,104 B1 | * | 9/2001 | Patterson et al. ............ 380/283 |

OTHER PUBLICATIONS

P. G. Kwiat, E. Waks, A. G. White, I. Applebaum, and P. H. Eberhard, "Ultrabright Source of Polarization–Entangled Photons," Phys., Rev. A, 60, R773 (1999).

* cited by examiner

*Primary Examiner*—Paul Ip
*Assistant Examiner*—Davienne Monbleau
(74) *Attorney, Agent, or Firm*—Milton D. Wyrick

(57) ABSTRACT

Utilizing the process of spontaneous parametric down-conversion in a novel crystal geometry, a source of polarization-entangled photon pairs has been provided that is more than ten times brighter, per unit of pump power, than previous sources, with another factor of 30 to 75 expected to be readily achievable. A high level of entanglement between photons emitted over a relatively large collection angle, and over a 10-nm bandwidth, is a characteristic of the invention. As a demonstration of the source capabilities, a 242-$\sigma$ violation of Bell's inequalities was attained in fewer than three minutes, and near-perfect photon correlations were achieved when the collection efficiency was reduced. In addition, both the degree of entanglement, and the purity of the state are readily tunable. The polarization entangled photon source can be utilized as a light source for the practice of quantum cryptography.

25 Claims, 7 Drawing Sheets

$$|\psi\rangle \Rightarrow |\cos(\theta)|\{|H\rangle_1|H\rangle_2\cos^2(\theta)+$$
$$|V\rangle_1|V\rangle_2\sin^2(\theta)\}$$
$$\therefore \varepsilon = \tan^2(\theta)$$

Here $\varepsilon = f\left(\dfrac{L_1}{L_2}\right)$

Focusing lens:

Pump build-up cavity:
Double-sided cones

Single sided cones

Mirror:

Multiple crystals:

Hybrid:

Compensated:

Optical superposing method:

ULTRA-BRIGHT SOURCE OF POLARIZATION-ENTANGLED PHOTONS

This application claims priority from provisional application Ser. No. 60/131,753, filed Apr. 30, 1999.

FIELD OF THE INVENTION

The present invention generally relates to light sources, and more particularly, relates to photon sources used for cryptography and other applications. This invention was made with Government support under Contract No. W-7405-ENG-36 awarded by the U.S. Department of Energy. The Government has certain rights in the invention.

BACKGROUND OF THE INVENTION

Entangled states of multiparticle systems are arguably the quintessential feature of quantum mechanics. These systems form the basis of quantum information, and enable such phenomena as quantum cryptography, dense coding, teleportation, and quantum computation. At present, the most accessible and controllable source of entanglement arises from the process of spontaneous parametric down-conversion in a nonlinear optical crystal. Herein is described a realization of an ultrabright source of polarization-entangled photon pairs, using two such nonlinear crystals. This was first described in the publication "Ultrabright Source of Polarization-Entangled Photons," P. G. Kwiat, E. Waks, A. G. White, I. Applebaum, and P. H. Eberhard, Phys. Rev. A, 60, R773 (1999). Because, in the present invention, nearly every pair of photons produced is polarization-entangled, the total flux of emitted polarization-entangled pairs should be hundreds of times greater than is achievable with the best previous source, for comparable pump powers. The new technique has the added advantage that the degree of entanglement and the purity of the state are readily tunable, a heretofore impossible feature.

It is now well known that the photons produced by way of the down-conversion process share nonclassical correlations. In particular, when a pump photon splits into two daughter photons, conservation of energy and momentum lead to entanglements in these two continuous degrees of freedom, as has been demonstrated in various tests of Bell's inequalities, showing that nature is nonlocal. Yet, conceptually, the simplest examples of entangled states of two photons are the polarization-entangled "Bell states:"

$$|H_1,V_2\pm|V_1,H_2\rangle; |H_1, H_2\pm|V_1,V_2\rangle;$$

where H and V denote horizontal and vertical polarization, respectively. For convenience, the normalization factor $(1/\sqrt{2})$ is omitted. To date there have been only two methods for producing such polarization-entangled photon pairs, and each has fairly substantial limitations.

The first method was an atomic cascade: a two-photon decay process from one state of zero angular momentum to another. The resulting photons do display nonclassical correlations, and were the photons used in the first tests of Bell's inequalities. However, these correlations decrease if the photons are not emitted back-to-back, as is allowed by recoil of the parent atom. This correlation problem was circumvented with parametric down-conversion, since the emission directions of the photons are well correlated.

The second method provides a source of truly polarization-entangled photons, and was realized using down-conversion with type-II phase matching, in which the photons are produced with definite orthogonal polarizations. For two particular emission directions, however, the correlated photons are produced in the state, HV+VH, and additional birefringent elements in one or both emission directions allow the formation of all four Bell states. This source has been employed to demonstrate quantum dense coding, teleportation, a post-selection-free test of Bell's inequality for energy and time variables, a test of Bell's inequality (for polarization variables) free of the usual rapid-switching loophole, and most recently, the generation of GHZ states of three photons. Coincidence count rates of up to ~2000 $s^{-1}$ (for a 3-mm thick BBO crystal and a 150 mW pump) have been observed with this source, while maintaining an acceptable level of entanglement.

Nevertheless, the brightness of this prior art source is still very limited because the photons are polarization-entangled only along two special directions. The present invention is capable of providing a bright source in which polarization-entangled photons are produced along all or nearly all emission directions.

It is therefore an object of the present invention to provide a bright source of polarization-entangled photons.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a laser for emitting polarized laser light, with at least two nonlinear crystals having optical axes positioned adjacent to any neighboring of the at least two nonlinear crystals, each of the optical axes forming a predetermined angle with adjacent optical axes of the at least two nonlinear crystals. The at least two nonlinear crystals receive the polarized laser light, and output light containing polarization entangled photon pairs.

In a further aspect of the present invention, and in accordance with its objects and principles, apparatus for producing a bright source of polarization entangled photons comprises a laser emitting laser light, with a polarizer in optical communication with the laser for polarizing the laser light. At least two nonlinear crystals having optical axes are positioned adjacent to any neighboring of the at least two nonlinear crystals, each of the optical axes forming a predetermined angle with adjacent optical axes of the at least two nonlinear crystals. The at least two nonlinear crystals receive the polarized laser light, and output light containing polarization entangled photon pairs.

In a still further aspect of the present invention, and in accordance with its objects and principles, a method for producing a bright source of polarization entangled photons comprises the steps of directing polarized laser light to at least two adjacent nonlinear crystals having optical axes, wherein each of the optical axes forms a predetermined angle with adjacent optical axes of the at least two adjacent nonlinear crystals; and outputting light from the at least two adjacent nonlinear crystals, the light containing polarization entangled photon pairs.

In a yet further aspect of the present invention, and in accordance with its objects and principles, a method for producing a bright source of polarization entangled photons comprises the steps of generating laser light; polarizing the laser light; transmitting the polarized laser light to at least two adjacent nonlinear crystals having optical axes, wherein each of the optical axes forms a predetermined angle with adjacent optical axes of the at least two nonlinear crystals; and outputting light from the at least two adjacent nonlinear crystals, the light containing polarization entangled photon pairs.

In still another aspect of the present invention and in accordance with its objects and principles, apparatus for providing a bright source of polarization entangled photons comprises a laser emitting laser light and means for directing the laser light to at least two nonlinear crystals, each of the at least two nonlinear crystals having optical axes forming a predetermined angle with the optical axes of other of the at least two nonlinear crystals, with each of the at least two nonlinear crystals outputting cones of polarized pairs of photons. Superposing means receive the cones of polarized pairs of photons for superposing the cones of polarized pairs of photons, so that light output from the superposing means contains entangled photon pairs.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides a method and apparatus for providing a bright source of polarization-coupled photons in which all pairs of a particular color are entangled through a novel arrangement of crystals. The invention can be most easily understood through reference to the below description and to the drawings.

Figure 1A:
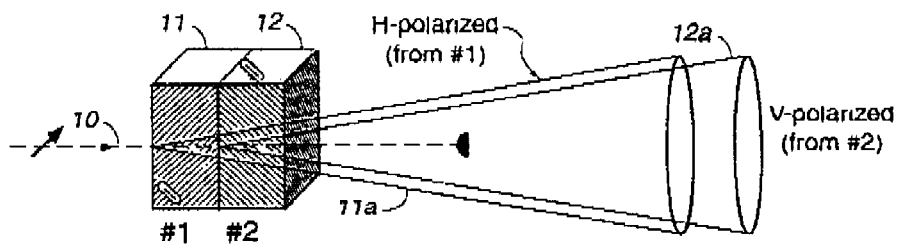
FIG. 1A schematically illustrates how the present invention produces polarization-entangled photons from two identical down-conversion crystals, oriented at 90° with respect to each other, i.e., the optic axis of the first (second) lies in the vertical (horizontal) plane.

Referring first to FIG. 1A there can be seen polarized pump beam 10 impinging on crystal 11 and crystal 12. Crystals 11, and 12 are identically cut, relatively thin, nonlinear crystals, operated with type-I phase matching. The crystals are oriented with their optic axes aligned in perpendicular planes. For the purposes of the present invention, the crystals are considered to be arranged so that the optical axes of the crystals are at predetermined angles with respect to adjacent crystals, although in the case of more than two crystals, some of the crystals could have the same predetermined angle, and in this case the predetermined angle could be 0°. In FIG. 1A, the optic axis of crystal 11 (or crystal 12) and the pump beam define the vertical plane, and the optic axis of the other crystal and the pump beam define the horizontal plane.

As shown, crystals 11, 12 are adjacent and in contact. However, contact between adjacent crystals is not a requirement of the present invention, and for that reason the term "adjacent" encompasses situations where the crystals are in contact and where the crystals are spaced apart a short distance.

Using this two-crystal geometry, used to simplify the description, the present invention discloses a source in which all pairs of a given color are entangled, as illustrated by horizontally polarized cone 11a, from crystal 11, and vertically polarized cone 12a from crystal 12. This effect will extend to most, if not all, of the spectral down-conversion output, i.e., to cones corresponding to different colors. It should be noted, however, that more than two crystals could be employed with the present invention so that an even brighter output and even greater number of entangled photon pairs would be produced.

With a vertically polarized pump beam 10, and the type-I coupling of crystals 11, 12, down-conversion will occur only in crystal 11, where the pump is extraordinarily polarized. The resulting down-conversion light cones will be horizontally polarized. Similarly, with a horizontally polarized pump beam 10, down-conversion will occur only in crystal 12, producing otherwise identical cones of vertically polarized photon pairs. A 45°-polarized pump beam 10 photon will be equally likely to down-convert in either crystal 11 or crystal 12 (neglecting losses from passing through crystal 11), and these two possible down-conversion processes are coherent with one another, as long as the emitted spatial modes 11a and 12a for a given pair of photons are indistinguishable for the two crystals 11, 12.

Based on a simple geometrical argument, the spatial overlap will be high as long as $\theta_{dc}L/D<<1$, with cone opening angle $\theta_{dc}$, crystals 11, 12 thickness L, and polarized pump beam 10 diameter D. Similar arguments describe the effect of transverse walkoff in crystals 11, 12 when $\theta_{dc}$ is replaced by walkoff angle $\rho$, which is typically approximately 4°.

Consequently, the photons will automatically be created in the state $HH+e^{i\phi}VV$. $\phi$ is determined by the details of the phase-matching and the thickness of crystals 11, 12. However, $\phi$ can be adjusted by tilting crystals 11, 12 (but this changes the cones' opening angles), by imposing a birefringent phase shift on one of the output beams, or by controlling the relative phase between the horizontal and vertical components of polarized pump beam 10.

Figure 1B:
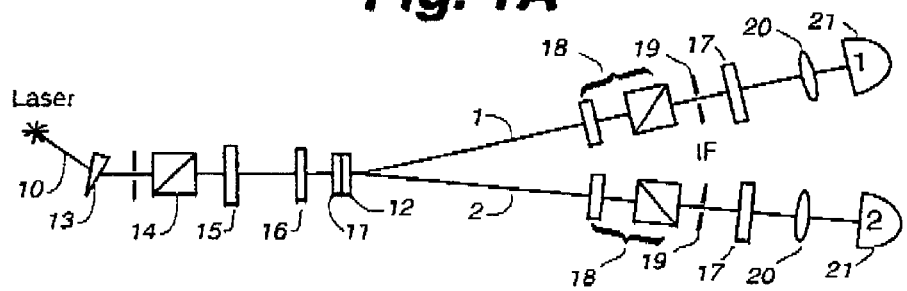
FIG. 1B schematically illustrates one embodiment of the apparatus of the present invention to pump and characterize the photon source.

FIG. 1B illustrates the experimented setup used to produce and characterize the correlated photons. The ~2 mm-diameter polarized pump beam 10, operating at 351.1 nm, was produced by an Ar$^+$laser, and directed to crystals 11, 12, after passing through: a dispersion prism 13 to remove unwanted background laser fluorescence; a polarizing beamsplitter (PBS) 14 to give a pure polarization state; a rotatable half waveplate (HWP) 15 to adjust the angle of the linear polarization; and a second, tiltable waveplate 16 for adjusting φ. Nonlinear crystals 11, 12 were Beta Barium Borate (β-BaB$_2$O$_4$) and generally known as BBO. Crystals 11, 12 were cut to a size of 8.0×8.0×0.59 mm, with each optic axis cut at φ$_{pm}$=33.9°. For this cut the degenrate-frequency photons at 702 nm are emitted into a cone of half-opening angle 3.0°. For most of the data presented here, interference filters (IF) 17, centered at 702 nm (FWHM ~5 nm), were used to reduce background and select only these nearly degenerated photons.

The polarization correlations were measured using adjustable polarization analyzers 18, each consisting of a PBS preceded by an adjustable HWP (for 702 nm). After passing through adjustable irises 19, the light was collected using 35 mm-focal length doublet lenses 20, and directed onto single-photon detectors 21: silicon avalanche photodiodes (EG&G #SPCM's), with efficiencies of ~65% and dark count rates of order 100 s$^{-1}$. The outputs of the detectors 21 were recorded directly, both as "singles," and in coincidence, using a time to amplitude converter and single-channel analyzer. A time window of 7 ns was found sufficient to capture the true coincidences. Typical "accidental" coincidence rates were negligible, being <1 s$^{-1}$.

Figure 2A:
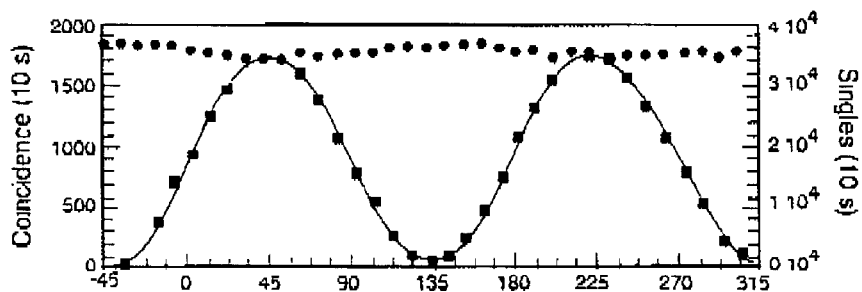
FIG. 2A graphically illustrated the measurements of the polarization entanglement produced by the apparatus of FIG. 1B.

In FIG. 2A, data demonstrating the extremely high degree of polarization-entanglement achievable with the present invention is shown. For this data, the state was set to HH-VV; polarization analyzer 18 in path 1 was set to −45°, and polarization analyzer 18 in path 2 was varied by rotating its HWP. As expected, the coincidence rate displayed sinusoidal fringes with nearly perfect visibility. A similar high-visibility curve also was recorded when polarization analyzer 18 in path 1 was set to 0°. In this case, the maxima occurred at 0° and 180°. As recorded, V=99.6±0.3% with "accidental" coincidences subtracted, and V=98.8±0.2% with them included. The singles rate was much flatter at V<3.4%. This is believed to be the highest purity entangled state ever reported. The collection irises 19 for this data were both only 1.76 mm in diameter. Under this condition, the collection efficiency, that is the probability of collecting one photon conditioned on collecting the other, is ~10%.

Figure 2B:
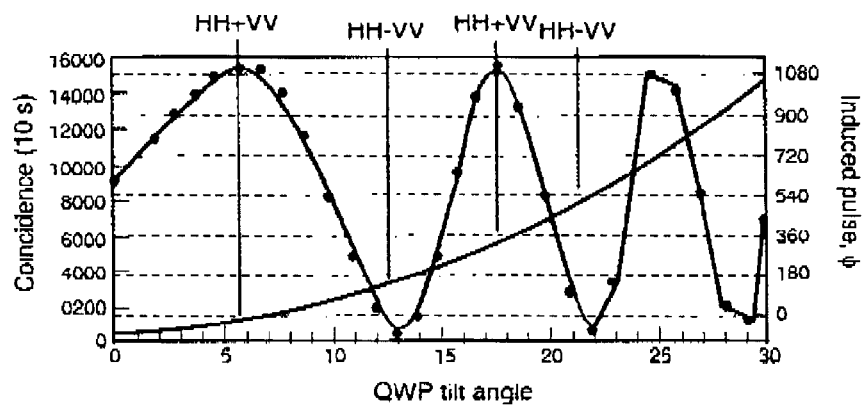
FIG. 2B graphically illustrated the ability to tune the relative phase between the HH and the VV term, in this embodiment by tilting the waveplate just before the crystal.

To experimentally verify that φ could be set by changing the ellipticity of the polarized pump beam 10, quarter waveplate 16 (zero-order, at 351 nm) before crystals 11, 12, was tilted about its optic axis (oriented vertically), thereby varying the relative phase between horizontal and vertical polarization components. FIG. 2B shows the coincidence rate with both analyzers at 45°. For φ=0, π, the states HH±VV are produced. Just as with the previous type-II source, the other two Bell states, HV±VH, may be prepared simply by inserting another half waveplate into one of arms 1, 2, to exchange H and V polarization.

Figure 3A:
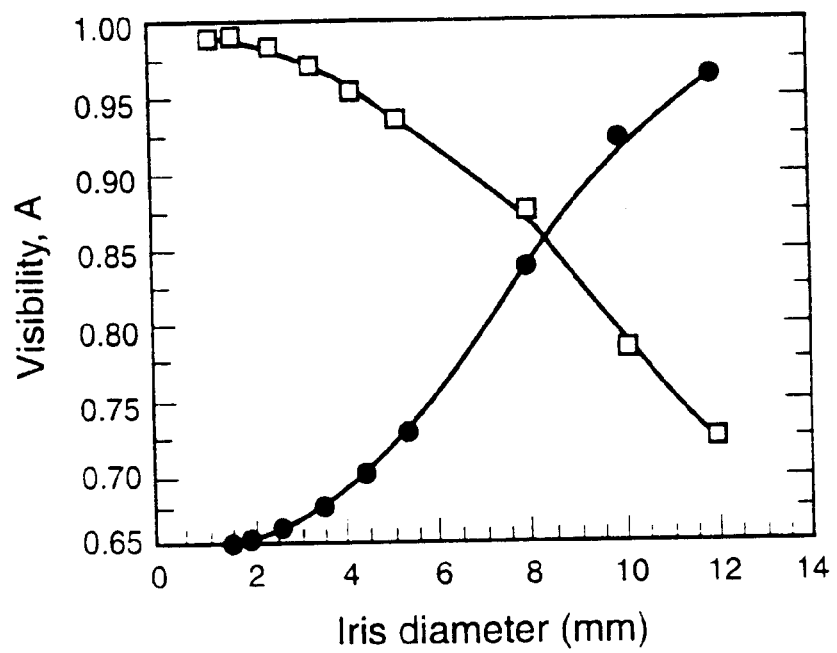
FIG. 3A graphically illustrates plots of the fringe visibility (triangles, left axis) and normalized coincidence count rate (circles, right axis) for the state HH-VV, versus the diameter of circular collection irises; and at FIG. 3B the vertical opening of apertures with a fixed horizontal width of 3.5 mm.
Figure 3B:
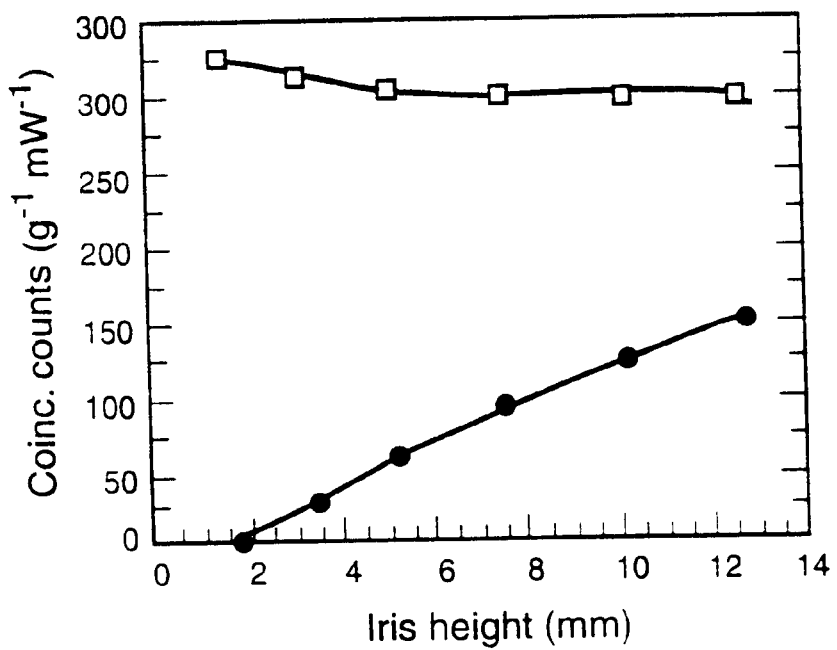

In order to characterize the robustness and brightness of this source according to the present invention, the visibility was measured as a function of the size of the collection irises 19, located 1 m from the BBO crystals 11, 12. Opening these irises 19 increases the aforementioned collection efficiency. In the first set of data, shown in FIG. 3A, circular irises were used. It can be seen that the visibility decreases somewhat as the iris size increases, while the coincidence rate, normalized by the input power of polarized pump beam 10, increases. In the second set of measurements, shown in FIG. 3B, a vertical slit of width 3.5 mm was added before each detector, and the vertical dimension of the aperture was again varied using the iris size. This meant that each detector 21 essentially saw a larger portion of the same cone. The visibility then stays essentially constant at ~95%, while the coincidence rate again increases. At the maximum opening (limited by the collection lens), over 140 coincidences were observed per second per milliwatt of power of polarized pump beam 10.

For a 150-mW polarized pump beam 10, this implies a coincidence rate of 21,000 s$^{-1}$, a factor of 10 increase over the previous type-II sources, which used BBO crystals 2.5 times longer than those used in the present invention. It is worth mentioning that this rate is roughly the minimum requirement for quantum cryptography in an earth-to-satellite configuration. It should also be noted that with this iris size, only about 8% of the down-conversion cone have been accessed. Given the symmetry of the output from the present invention, strong entanglement over the entire cone is expected, implying a total polarization-entangled pair production rate (over the 5-nm bandwidth) of about 10,000 s$^{-1}$ mW$^{-1}$, where filter transmissions and detector efficiencies have been divided out.

As an additional demonstration of the ability of the source of the present invention, a measurement of Bell's inequality was performed with the 5-nm interference filters 17 replaced by 10 nm-wide filters centered at 702 nm. The UV polarized pump beam 10 power was increased to 60 mW, and the irises 19 set at 3.5×12.7 mm. The coincidence rates were recorded for 16 combinations of analyzer 18 settings [θ$_1$=0, 90°, −45°, 45°; θ2=−22.5°, 67.5°, 22.5°, 112.5°]. These settings may be combined to yield a value for the parameter S=2.7007 ±0.0029, where according to any local realistic theory |S|≦2, and the maximum according to quantum mechanics is 2√2. Due to the very high coincidence count rates obtained for this measurement, over 10,000 s$^{-1}$, the necessary statistics for this 242-σ violation were obtained in only 160s of data collection.

So far, only photons belonging to a single cone of colors have been considered, although the arguments given above should apply to every such cone, even when the down-converted photons have non-degenerate frequencies. However, due to dispersion in nonlinear crystals 11, 12, the relative phase φ will in general depend on the particular wavelength pairs being considered. If one desires all detected down-conversion photons to be described by essentially the same polarization-entangled state, the bandwidth of acceptance needs to be restricted, the crystals 11, 12 thicknesses reduced, or a special birefringent compensation element included. An acceptable range of phase variation (φ≦26°, the value for which fringe visibility V=cos{φ}≧0.9) is maintained for a bandwidth of 30 nm, assuming no other visibility-degrading effects come into play. Scaling the earlier 5-nm bandwidth result, a total output over the entire cones making up this bandwidth of ~60,000 s$^{-1}$ mW$^{-1}$ is to be expected. This is ~300 times brighter than the polarization-entangled photon-pair production rates obtainable with the previous down-conversion schemes, and 750 times brighter if scaled by the thicknesses of crystals 11, 12.

An important feature of the source according to the present invention is that it may be used to produce "non-maximally entangled" states, that is, states of the form HH+εVV, |ε|≠1, simply by rotating the polarization of polarized pump beam 10, for example, using waveplate 15. For a polarized pump beam 10 polarized at angle θ to the vertical, ε=tan θ. Such states enlarge the accessible Hilbert space of quantum states. As far as is known, the source according to the present invention is the first source to enable preparation of such states, at any rate of production.

This technique has been experimentally demonstrated; details of this experiment may be found in the publication "Non-Maximally Entangled States: Production, Characterization, and Utilization, A. G. White, D. F. V. James, P. H. Eberhard, and P. G. Kwiat, Phys. Rev. Lett., 83, 3103 (1999). In particular, partially-entangled states of the form HH+εVV, for ε=0.11, 0.31, 0.98, 3.0, and 8.9, have been prepared successfully. These states were characterized by a standard analysis using coincidence minima, and by quantum state tomography of the two-photon state. In all cases, the results obtained were in very good agreement with the theoretical predictions.

Figure 4A:
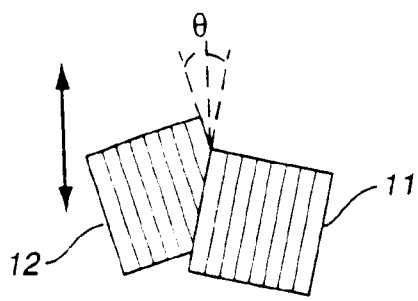

Another simple method of producing non-maximally entangled states is illustrated in FIG. 4A. Here, crystals 11, 12, are tilted with respect to each other, forming an angle 2θ. The relationship for this configuration is:

$$|\Psi\rangle \rightarrow |\cos(\theta)|\{|H\rangle_1|H\rangle_2 \cos^2(\theta) + |V\rangle_1|V\rangle_2 \sin^2(\theta)\}$$

Figure 4B:
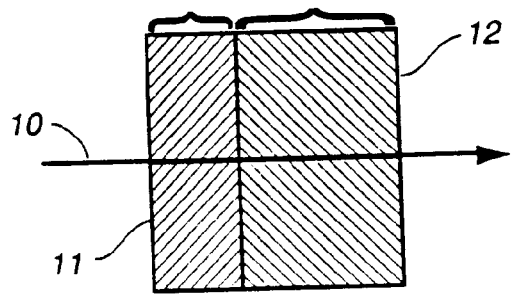

Therefore, in the case of tilting crystals 11, 12 by an angle θ, the value of ε=$\tan^2 \theta$. FIG. 4B illustrates yet another embodiment for producing non-maximally entangled states by having crystals 11, 12 have different thicknesses. In this situation, $$\varepsilon = f\left(\frac{L_1}{L_2}\right).$$

Moreover, the present invention has the capability to produce arbitrary (partially-) mixed states of the type $\cos^2\theta|H_1,H_2\rangle\langle H_2,H_1| + \sin^2\theta|V_1,V_2\rangle\langle V_2,V_1|$. It only is necessary to impose on polarized pump beam 10 a polarization-dependent time delay that is greater than the pump photon coherence time, for mixed states, or comparable to it, for partially mixed states.

Figure 5:
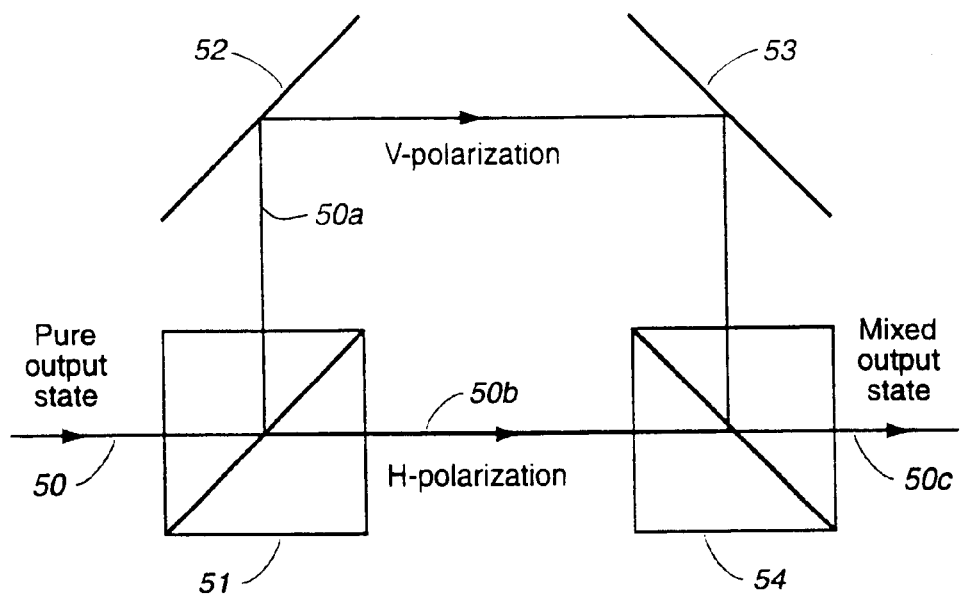

One method that can be used to produce these arbitrary mixed states through introduction of a relative time delay between the horizontal and vertical polarization components of the photon is illustrated in FIG. 5. Here, photons 50 from polarized pump beam 10 are input to polarizing beamsplitter 51. As shown, vertically polarized photons 50a are directed to 45° mirror 52 and reflected to 45° mirror 53. From 45° mirror 53, vertically polarized photons 50a are reflected to polarizing beamsplitter 54. Horizontally polarized photons 50b continue through polarizing beamsplitter 51 on to polarizing beamsplitter 54. In polarizing beamsplitter 54, time-delayed vertically polarized photons 50a combine with horizontally polarized photons 50b to form mixed output state photons 50c.

Of course, those with skill in this art will readily realize that there are many ways to produce the needed delay. The example of FIG. 5 is only one such method. It should be remembered, however, that the delay time must be larger than the coherence time of the photons for full mixing, and comparable to this coherence time for partial mixing.

As indicated above, the down-conversion photon pairs are automatically entangled both in energy and momentum. Hence, for a two-crystal 11, 12 scheme, the photons are actually simultaneously entangled in all degrees of freedom. As used herein, this state is referred to as being "hyper-entangled." Such states may benefit certain efforts in the field of quantum information.

Figure 6A:
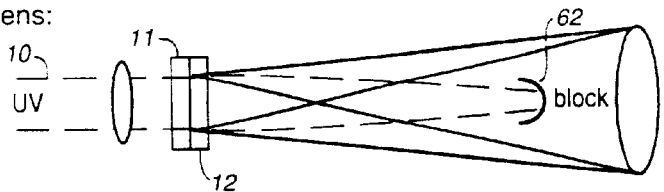
FIGS. 6A through 6H illustrate other embodiments of the present invention dealing with focusing lens, cavities, the application of multiple crystals, the use of birefringent compensation elements, and the use of other optical elements to superpose the outputs of the crystals.

Other embodiments of the present invention, illustrated in FIGS. 6A–6G, includes at FIG. 6A, focusing optics 61 are used to focus polarized pump beam 10 with block 62. This embodiment provides focused, corrected output beams, and higher collected efficiency, and potentially better coupling to fiber optics.

Figure 6B:
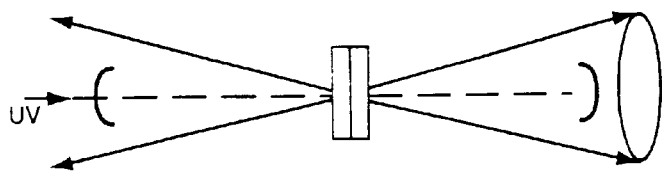

As shown in FIG. 6B, a cavity 63 can increase the effective power of polarized pump beam 10. At b) (1) cavity 63 is configured to produce double-sized cones. At b) (2), cavity 63 is configured so as to produce single-sided cones.

Figure 6C:
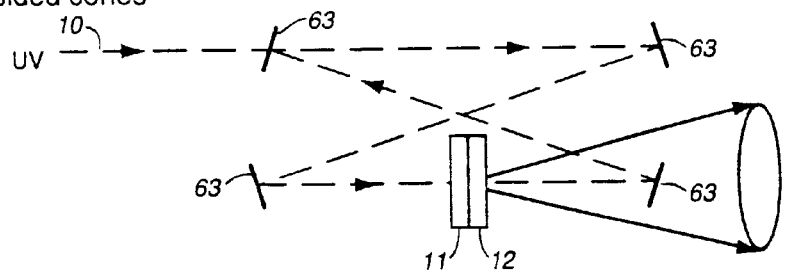

In FIG. 6C, mirror 64 is attached to crystals 12, This provides a double pass through crystals 11, 12, yielding twice the output brightness. This embodiment also provides automatic compensation of some walkoff effects.

Figure 6D:
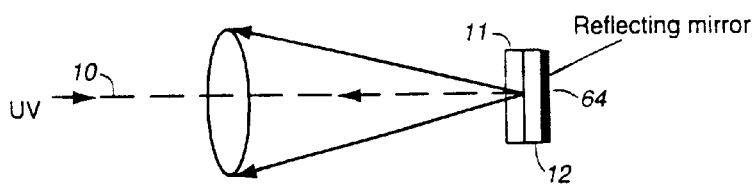

At FIG. 6D the embodiment utilizing more than two crystals is illustrated. Here polarized pump beam 10 is incident on crystals 11, 12, 65, and 66, and because of the conversion in each of the four crystals, higher output brightness is attained, while maintaining good cone overlap. As in FIG. 6A, block 62 is employed.

Figure 6E:
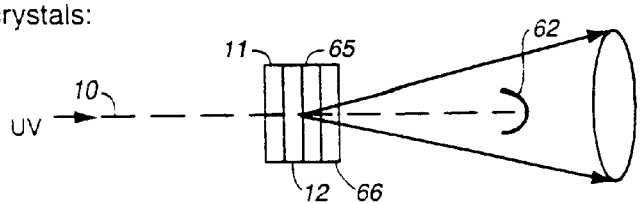

Reference should now be directed to FIG. 6E, where a hybrid embodiment is illustrated, where four crystals 11, 12, 65, and 66 are illustrated with crystal 66 having reflecting mirror 64 attached to its outer face. Mirror-coated meniscus lens 68 focuses polarized pump beam 10, and forms a cavity with reflecting mirror 64.

Figure 6F:
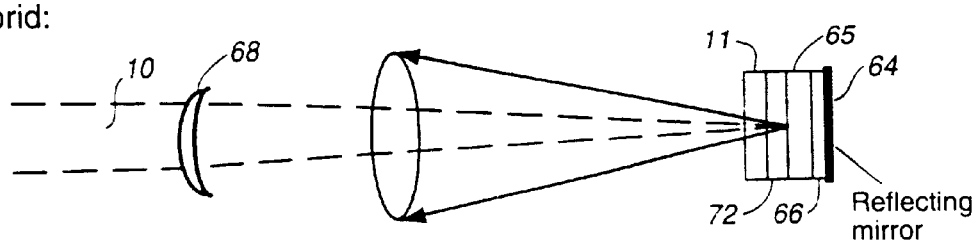

In FIG. 6F, an embodiment is shown incorporating extra birefringent crystal elements 69, 70 through which the entangled photons pass. These crystals 69, 70 may be used to compensate for any temporal or spatial "walkoff" effects arising from the birefringent nature of the down-conversion crystals 11, 12. Birefringement_crystal elements may also be used to ensure that the relative phase between the production processes in down-conversion crystals 11, 12, that is, between the HH and the VV terms, does not vary with emission direction.

Figure 6G:
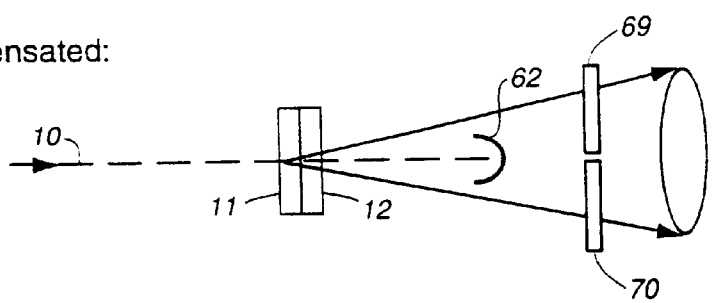
Figure 6H:
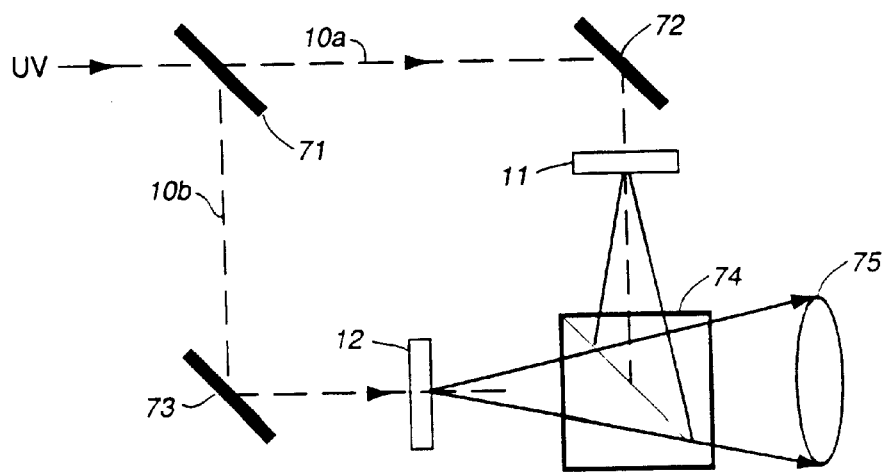

Finally, in FIG. 6G, in still another embodiment, the output cones of crystals 11, 12 are superposed. As shown, beamsplitter 71 splits polarized pump beam into two split beams 10a, 10b. Beamsplitter 71 can be either a nonpolarizing beamsplitter or a polarizing beamsplitter. Split beam 10a is directed to mirror 72 and to crystal 11. In like manner, split beam 10b is directed to mirror 73 and to crystal 12. Crystals 11, 12 will each produce an output cone, the two cones possessing different polarizations, and which cones are directed to polarizing beam splitter 74. In polarizing beamsplitter 74, the output cones of crystals 11, 12 are superposed to form output cone 75. In FIG. 6G, the output cone of crystal 11 is shown as having vertical polarization and the output cone of crystal 12 is shown as having horizontal polarization. By altering the intensity of split beam 10a and/or split beam 11a, or by varying the polarization angles of the output cones of crystals 11, 12, non-maximally entangled photon states also may be created.

Of course, those possessing skill in this art readily will realize that there are many ways to superpose the outputs of crystals 11, 12. The configuration shown in FIG. 6B at g) is only an example of one method. It should be remembered, however, that the output cones of crystals 11, 12 must overlap in both space and direction in order that the output photons in output cone 77 will be entangled in polarization.

For practice of the invention, crystals 11, 12, and any other crystals employed, can vary in thickness according to the desired application. For the examples herein, thicknesses of 0.59 mm were used. However, other thickness and crystal dimensions may be employed to achieve desired results, and the present invention is not to be limited to a particular thickness. In addition, crystals other than BBO can be employed and other wavelengths can be used for polarized pump beam 10 (FIG. 1). For the examples described herein a continuous wave pump was used. However, pseudo-continuous and pulsed pump sources also may be used. These sources may be of particular value in simultaneously producing multiple pairs of entangled photons.

The polarization-entangled photons produced by the present invention are suitable particularly for use in various quantum cryptography protocols. In particular, the nonclassical correlations enable two or more separated recipients to generate a shared secret random key, which the recipients may then use for encryption purposes.

In one protocol, each photon of a quantum-mechanically entangled pair is sent to the sender and the receiver, who each randomly measure the polarization in various bases. If the bases are the same, then sender and receiver will have completely correlated measurements, which become the shared secret key. Other combinations of measurements can be used to test Bell's inequalities that limit the possible correlations achievable with any local realistic theory. The presence of any intermediate eavesdropper would reduce the amount of violation of Bell's inequality to below the level predicted by quantum mechanics. The presence of an eavesdropper also may be detected by checking the rate of errors in a randomly chosen portion of the received string.

Using the polarization-entangled photon pairs produced from practice of the present invention, this process has been implemented experimentally, as described in the publication, "Entangled State Quantum Cryptography: Eavesdropping on the Ekert Protocol," D. S. Naik, C. G. Peterson, A. G. White, A. J. Berglund and P. G. Kwiat, to appear in Phys. Rev. Lett. Liquid crystals were used to randomly measure each photon in one of 4 bases. Of the sixteen possible combinations (as in {4 for sender}×{4 for receiver}), half of them were used in two tests of Bell's inequalities, while one fourth contributed to the cryptographic key. In four independent runs of approximately 10 minutes each, a total of 24,252 secret key bits, with a bit error rate (BER) of 3.1±0.1, were obtained. After appropriate error detection and privacy amplification techniques were performed on the raw key bits, 15,444 useful secret key bits remained.

Previously, it has been demonstrated that any eavesdropper will not be able to intercept the photons without also producing a detectable change. In other words, the laws of physics forbid the possibility of an undetectable eavesdropper. Various eavesdropping strategies, including strong measurements of the polarization, and "quantum non-demolition" (QND) measurements, were experimentally investigated. These latter eavesdropping strategies were simulated by introduction of a decohering birefringent element. With a collection rate of approximately 50 Hz, which was limited by the response times of the liquid crystals, and a BER of 3%, the presence of an eavesdropper was detected reliably in fewer than 5 seconds of data collection.

Figure 7B:
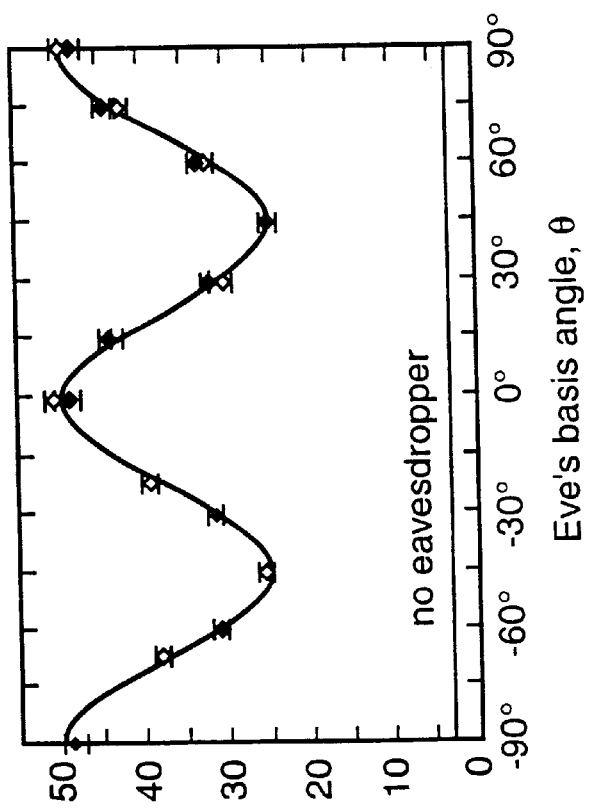
FIGS. 7A and 7B illustrate the effect an eavesdropper would produce in a quantum cryptography application.
Figure 7A:
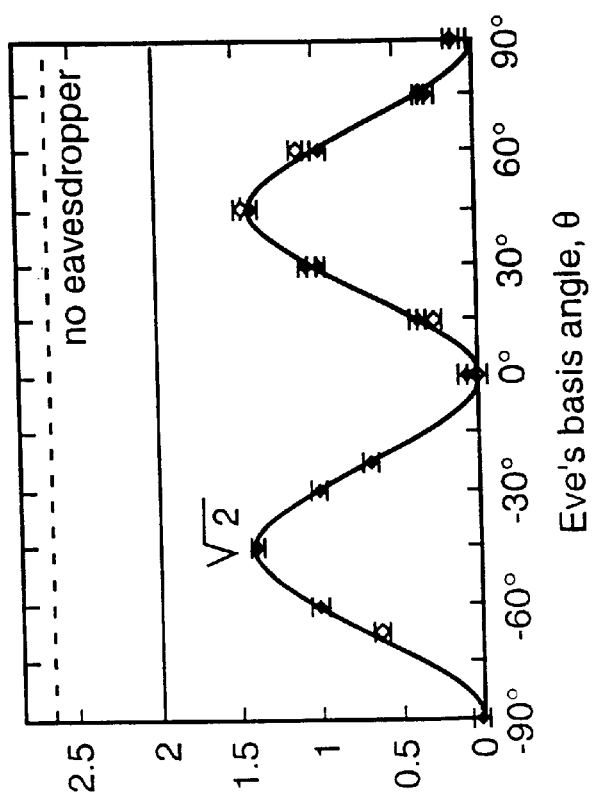

This detection ability is illustrated in FIG. 7, where experimental data is represented by symbols and theory is represented by the curves, showing the effect of an eavesdropper on the Bell parameter, S, and on the BER, for attacks in the linear basis, $\cos \theta |H> + \sin \theta |V>$. A strong polarizing attack is shown by the diamonds, and a pseudo-QND measurement in the same basis is shown by the circles. The maximum value of $|S|$ for any local realistic theory is 2. With no eavesdropper present, $|S|$ was measured to be 2.66±0.04 as shown by the dotted line at a). The clear effect of an eavesdropper on the BER is shown at b). The BER with no eavesdropper was 3.1%.

The use of the present invention in distribution of the random key is superior to the currently practiced methods that rely on weak pulses of light. Weak pulses of light are potentially vulnerable to certain quantum eavesdropping attacks. Using the entangled photons of the present invention reduces such vulnerabilities.

Through the use of spontaneous down-conversion in a two-crystal geometry, a tunable source of polarization-entangled photon pairs has been disclosed. Because this entanglement exists over the entire cones of emitted light, instead of only along particular directions, this source is much brighter than previous sources, allowing a tremendous Bell inequality violation in only minutes. Such brightness is completely necessary for some applications, like quantum cryptography to a satellite. Additionally, it is very advantageous for other applications, like teleportation, which requires two pairs of entangled photons, and hence scales as the square of the source intensity. Due to the simplicity and robustness of the present invention, this source should benefit many ongoing pursuits that make use of correlated photon pairs.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for producing a bright source of polarization entangled photons comprising:

a laser for emitting polarized laser light;

at least two nonlinear crystals having optical axes positioned adjacent to any neighboring of said at least two nonlinear crystals, each of said optical axes forming a predetermined angle with adjacent optical axes of said at least two nonlinear crystals, said at least two nonlinear crystals receiving said polarized laser light;

wherein light output from said at least two nonlinear crystals contains polarization entangled photon pairs.

2. The apparatus as described in claim 1 wherein said laser comprises an Argon ion laser.

3. The apparatus as described in claim 1 wherein said at least two nonlinear crystals comprise at least two β-barium borate nonlinear crystals.

4. The apparatus as described in claim 1, further comprising a lens in optical communication with said laser for focusing said polarized light through said at least two nonlinear crystals.

5. The apparatus as described in claim 1 wherein said polarized light is polarized at a 45° angle.

6. The apparatus as described in claim 1 wherein said at least two nonlinear crystals comprise four nonlinear crystals.

7. The apparatus as described in claim 1 wherein said at least two nonlinear crystals comprise first and second nonlinear crystals, each having a first and second face, wherein said second face of said first crystal is adjacent to said first face of said second crystal, and a mirror is adjacent to said second face of said second crystal.

8. The apparatus as described in claim 1 wherein a first portion of said polarized laser light is time delayed with respect to a second portion of said polarized laser light to produce tunable mixed polarization states.

9. Apparatus for producing a bright source of polarization entangled photons comprising:

a laser emitting laser light;

a polarizer in optical communication with said laser for polarizing said laser light;

at least two nonlinear crystals having optical axes positioned adjacent to any neighboring of said at least two nonlinear crystals, each of said optical axes forming a predetermined angle with adjacent optical axes of said at least two nonlinear crystals, said at least two nonlinear crystals receiving said polarized laser light;

wherein light output from said at least two nonlinear crystals contains polarization entangled photon pairs.

10. The apparatus as described in claim 9 wherein said laser comprises an Argon ion laser.

11. The apparatus as described in claim 9 wherein said at least two nonlinear crystals comprise two beta-barium borate nonlinear crystals.

12. The apparatus as described in claim 9, further comprising a lens in optical communication with said laser for focusing said polarized light through said at least two nonlinear crystals.

13. The apparatus as described in claim 9 wherein said polarized light is polarized at a 45° angle.

14. The apparatus as described in claim 9 wherein said at least two nonlinear crystals comprise four nonlinear crystals.

15. The apparatus as described in claim 9 wherein said at least two nonlinear crystals comprise first and second nonlinear crystals, each having a first and second face, wherein said second face first crystal is adjacent to said first face of said second crystal, and a mirror is adjacent to said second face of said second crystal.

16. The apparatus as described in claim 9 wherein a first portion of said polarized laser light is time delayed with respect to a second portion of said polarized laser light to produce tunable mixed polarization states.

17. A method of producing a bright source of polarization entangled photons comprising the steps of:

directing polarized laser light to at least two adjacent nonlinear crystals having optical axes, wherein each of said optical axes forms a predetermined angle with adjacent optical axes of said at least two adjacent nonlinear crystals;

outputting light from said at least two adjacent nonlinear crystals, said light containing polarization entangled photon pairs.

18. The method as described in claim 17, further comprising the step of time delaying a first portion of said polarized laser light with respect to a second portion of said polarized laser light.

19. A method of producing a bright source of polarization entangled photons comprising the steps of:

generating laser light;

polarizing said laser light;

transmitting said polarized laser light to at least two adjacent nonlinear crystals having optical axes, wherein each of said optical axes forms a predetermined angle with adjacent optical axes of said at least two nonlinear crystals;

outputting light from said at least two adjacent nonlinear crystals, said light containing polarization entangled photon pairs.

20. The method as described in claim 19 further comprising the step of time delaying a first portion of said polarized laser light with respect to a second portion of said polarized laser light.

21. Apparatus for providing a bright source of polarization entangled photons comprising:

a laser emitting laser light;

means for directing said laser light to at least two nonlinear crystals, each of said at least two nonlinear crystals having optical axes forming a predetermined angle with said optical axes of other of said at least two nonlinear crystals, each of said at least two nonlinear crystals outputting cones of polarized pairs of photons;

superposing means receiving said cones of polarized pairs of photons for superposing said cones of polarized pairs of photons;

wherein light output from said superposing means contains entangled photon pairs.

22. The apparatus as described in claim 21 wherein said laser comprises an Argon ion laser.

23. The apparatus as described in claim 21 wherein said nonlinear crystal comprises two β-barium borate nonlinear crystals.

24. The apparatus as described in claim 21 wherein said polarized light is polarized at a 45° angle.

25. The apparatus as described in claim 21 wherein a first portion of said polarized laser light is time delayed with respect to a second portion of said polarized laser light to produce tunable mixed polarization states.

* * * * *